United States Patent [19]
Miess et al.

[11] Patent Number: 5,290,907
[45] Date of Patent: Mar. 1, 1994

[54] AUTOMATIC COPOLYAMIDE

[75] Inventors: Georg-Emerich Miess, Königstein/Taunus; Peter Klein, Wiesbaden; Karl Heinrich, Grossaitingen, all of Fed. Rep. of Germany

[73] Assignee: Hoechst Aktiengesellschaft, Frankfurt am Main, Fed. Rep. of Germany

[21] Appl. No.: 834,584

[22] Filed: Feb. 12, 1992

[30] Foreign Application Priority Data

Feb. 14, 1991 [DE] Fed. Rep. of Germany ....... 4104394

[51] Int. Cl.$^5$ ............................................. C08G 69/32
[52] U.S. Cl. ..................... 528/183; 528/125; 528/128; 528/172; 528/184; 528/185; 528/190; 528/191; 528/193; 528/337; 528/344; 528/348
[58] Field of Search ............... 528/183, 340, 184, 185, 528/190, 191, 193, 125, 128, 172, 344, 348, 337

[56] References Cited

U.S. PATENT DOCUMENTS

| 4,847,354 | 7/1989 | Keil et al. | 528/340 |
| 4,987,215 | 1/1991 | Keil et al. | 528/329.1 |
| 4,987,216 | 1/1991 | Keil et al. | 528/329.1 |
| 5,006,629 | 4/1991 | Santa et al. | 528/340 |

FOREIGN PATENT DOCUMENTS

| 0307993 | 3/1989 | European Pat. Off. . |
| 364892 | 4/1990 | European Pat. Off. . |
| 3007063 | 8/1980 | Fed. Rep. of Germany . |
| 0199090 | 10/1986 | Fed. Rep. of Germany . |

Primary Examiner—Harold D. Anderson
Attorney, Agent, or Firm—Connolly and Hutz

[57] ABSTRACT

There are described aromatic copolyamides which are soluble in organic polyamide solvents and which consist essentially of recurring structural units of the formulae Ia, Ib and Ic on the one hand and Ia, Ib and Ie on the other

[—OC—R$^1$—CO—NH—R$^2$—NH—] (Ia),
[—OC—R$^1$—CO—NH—R$^3$—NH—] (Ib),

[—OC—R$^1$—CO—NH—R$^4$—NH—] (Ic),
[—OC—R$^1$—CO—NH—R$^7$—NH—] (Ie), where R$^1$ and R$^7$ are divalent aromatic radicals whose valence bonds are in the para or a comparable coaxial or parallel position relative to one another, R$^2$ is a radical of the formula III

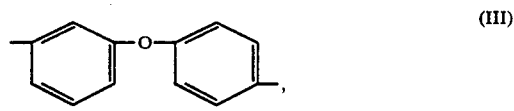

and R$^3$ and R$^4$ are radicals of the formula IV

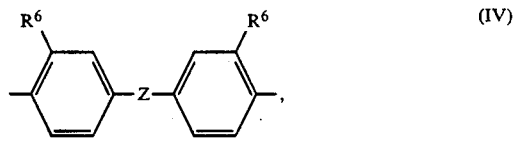

where Z is —O—, —S—, —CO—, —SO$_2$—, C$_1$-C$_{10}$-alkylene or —O—R$^1$—O— and R$^6$ is in each case hydrogen or an inert substituent.

The mole fractions of the individual structural features in the copolyamides are defined within selected limits. The claimed copolyamides are notable for good dynamic efficiency.

12 Claims, No Drawings

AUTOMATIC COPOLYAMIDE

The invention relates to novel aromatic copolyamides of the dicarboxylic acid-diamine type which are spinnable from solutions in organic solvents, structures formed therefrom such as filaments, fibers, pulp, films, sheets and membranes of very high initial modulus (modulus of elasticity), and also processes for preparing them.

Aromatic polyamides (aramids) are, as will be known, raw materials of high thermal and chemical stability and low flammability. For instance, fibers and sheets from such raw materials have very good mechanical properties, such as high strength and a high initial modulus (modulus of elasticity), and are highly suitable for technical uses, for example for reinforcing plastics or as filter materials.

It is known that aramid filaments or fibers of high strength and a very high initial modulus can be prepared when the amide bonds on the aromatic nuclei are coaxial or virtually parallel to one another, thereby forming rigid, rodlike polymer molecules.

A typical polyamide of this kind is for example poly (p-phenyleneterephthalamide). Filaments therefrom are described for example in German Patent 2,219,703.

This polyamide has a number of advantages, but its preparation and processing are very difficult. For instance, because of low solubility in polar organic solvents, even in the presence of inorganic salts such as calcium chloride or lithium chloride as solubilizers, this polymer precipitates from the reaction medium very shortly after it has been formed. It has to be isolated, washed, dried and then dissolved again in a spinning solvent. The preferred solvent for preparing spinning solutions is concentrated sulfuric acid, which presents particular handling (workplace Bafety, corrosion) and waste disposal problems.

Attempts have therefore been made to bypass these difficulties by developing copolyamides which are readily soluble in the known amide solvents, which are also readily spinnable and whose filaments, after drawing, have high strength values and initial moduli.

For instance, German Patent 2,556,885 and German Offenlegungsschrift 3,007,063 describe copolyamides of terephthalic acid, p-phenylenediamine and 3,4'-diaminodiphenyl ether which give readily spinnable isotropic solutions in amide solvents. High strength and moduli can be conferred on the filaments by drawing to a very high draw ratio. The increased solubility is due to the meta orientation and the oxygen atom. However, it has been found that the further processing of filaments of such copolyamides is not as yet satisfactory, since the dynamic efficiency of such filaments leaves something to be desired.

It is an object of the present invention to find further aromatic copolyamides which are readily soluble in polyamide solvents and readily spinnable and from which it is possible to produce filaments having good mechanical properties, especially an excellent dynamic efficiency and/or good flex abrasion resistance and/or knot strength and/or loop strength.

The copolyamides of the invention contain selected proportions of selected aromatic diamine components.

The invention provides aromatic copolyamides which are soluble in organic polyamide solvents and which consist essentially of at least 95 mol% of recurring structural units of the formulae Ia, Ib and Ic or Ia, Ib and Ie and optionally of up to 5 mol% of recurring structural units of the formula Id

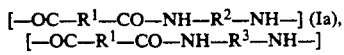
[—OC—R$^1$—CO—NH—R$^2$—NH—] (Ia),
[—OC—R$^1$—CO—NH—R$^3$—NH—]  (Ib),

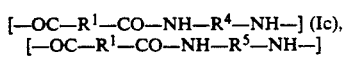
[—OC—R$^1$—CO—NH—R$^4$—NH—] (Ic),
[—OC—R$^1$—CO—NH—R$^5$—NH—]  (Id),

[—OC—R$^1$—CO—NH—R$^7$—NH—]  (Ie), where the mole fractions of the radicals $R^2$, $R^3$ and $R^4$ in the copolyamides with the structural units of the formulae Ia, Ib and Ic, based on the sum total of these radicals in the copolyamide, lie within the following limits:

Radical $R^2$: from 5 to 70 mol%, preferably from 15 to 50 mol%, in particular from 20 to 30 mol%, Radical $R^3$: from 5 to 70 mol%, preferably from 15 to 60 mol%, in particular from 20 to 30 mol%, and Radical $R^4$: from 5 to 70 mol%, preferably from 15 to 60 mol%, in particular from 40 to 60 mol%, where the mole fractions of the radicals $R^2$, $R^3$ and $R^7$ in the copolyamides with the structural units of the formulae Ia, Ib and Ie, based on the sum total of these radicals in the copolyamide, lie within the following limits:

Radical $R^2$: from 5 to 70 mol%, preferably from 15 to 60 mol%, in particular from 20 to 30 mol%, Radical $R^3$: from 15 to 70 mol%, preferably from 20 to 60 mol%, in particular from 20 to 30 mol%, and Radical $R^7$: from 5 to 70 mol%, preferably from 15 to 60 mol%, in particular from 40 to 60 mol%. In the above formulae Ia to Ie, $R^1$ is to an extent of at least 95 mol%, based on all the radicals $R^1$ in the copolyamide, a radical of the formula IIa and up to 5 mol% of all radicals $R^1$ can have the structure of the formula IIb

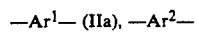
—Ar$^1$— (IIa), —Ar$^2$—  (IIb), where Ar$^1$ is a divalent aromatic radical whose valence bonds are in the para or a comparable coaxial or parallel position relative to one another and which is optionally substituted by one or two inert radicals, and Ar$^2$ is a divalent aromatic radical whose valence bonds are in the meta or a comparable kink position relative to one another and which is optionally substituted by one or two inert radicals.

In the above formulae Ia to Ie, $R^2$ a radical of formula III

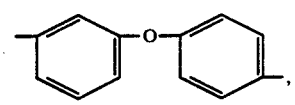

$R^3$ is a radical of the formula IV

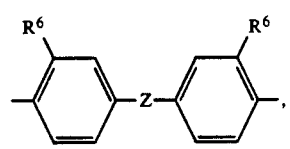

where each $R^6$ independently of the other hydrogen or an inert radical and Z is selected from the group consisting of —O—, —S—, —CO—, —SO$_2$—, C$_n$H$_{2n}$— and —O—Ar$^1$—O—, where n is an integer from 1 to 10 and Ar$^1$ is as defined above, R$^4$ is a radical which differs from R$^3$ which has been selected from one of the structures defined for R$^3$, R$^5$ is a radical selected from one of the structures defined for Ar$^2$, and R$^7$ is an unsubstituted divalent aromatic radical whose valence bonds are in the para or a comparable coaxial or parallel position relative to one another.

If any substituents in the radicals Ar$^1$, Ar$^2$, R$^3$, R$^4$ or R$^5$ are inert radicals, these radicals can be monovalent inorganic radicals, such as halogen, or monovalent organic radicals, such as alkyl, alkoxy, bis(n-alkyl)-amino, bis(N-alkyl)amido or nitrile. The expression "inert radical" means that these substituents are nonreactive under the preparation and processing conditions for the copolyamides according to the present invention.

Preferred inert radicals are chlorine or $C_1$-$C_6$-alkyl or $C_1$-$C_6$-alkoxy, in particular straight-chain $C_1$-$C_6$- alkyl or alkoxy. Examples thereof are methyl, ethyl, n-propyl, isopropyl, n-butyl, n-pentyl and n-hexyl or methoxy, ethoxy, n-propyloxy, isopropyloxy, n-butyloxy, n-pentyloxy or n-hexyloxy.

Particularly preferred inert radicals are chlorine, methoxy or methyl.

If any radicals are divalent aromatic radicals whose valence bonds are in the para or a comparable coaxial or parallel position relative to one another, these radicals are monocyclic or polycyclic aromatic hydrocarbon radicals or heterocyclic-aromatic radicals which can be monocyclic or polycyclic. Heterocyclic-aromatic radicals have in particular one or two oxygen, nitrogen or sulfur atoms in the aromatic nucleus.

Polycyclic aromatic radicals can be fused to one another or bonded linearly to one another via C—C bonds or via a —CO—NH— group.

The valence bonds which are in a coaxial or parallel position relative to one another point in opposite directions. An example of coaxial bonds pointing in opposite directions are the 4,4'-biphenyl bonds. An example of parallel bonds pointing in opposite directions are the 1,5- or 2,6-naphthalene bonds, whereas the 1,8-naphthalene bonds are parallel but point in the same direction.

Examples of preferred divalent aromatic radicals whose valence bonds are in the para or a comparable coaxial or parallel position relative to one another are monocyclic aromatic radicals having mutually para-disposed free valences, in particular 1,4-phenylene, or bicyclic fused aromatic radicals having parallel bonds pointing in opposite directions, in particular 1,4-, 1,5- and 2,6-naphthylene, or bicyclic aromatic radicals linked via a C—C bond or via a —CO—NH— group with coaxial bonds pointing in opposite directions, in particular 4,4'-biphenylene or a radical of 4,4'-diaminobenzanilide. Particularly preferred radicals R$^7$ are 1,4-phenylene and the radical of 4,4'-diaminobenzanilide. Ar$^1$ is preferably 1,4-phenylene.

If any radicals are divalent aromatic radicals whose valence bonds are in the meta or in a comparable kinked position relative to one another, they are monocyclic or polycyclic aromatic hydrocarbon radicals or heterocyclicaromatic radicals which can be monocyclic or polycyclic. Heterocyclic-aromatic radical have in particular one or two oxygen, nitrogen or sulfur atoms in the aromatic nucleus.

Polycyclic aromatic radicals can be fused to one another or linked to one another via C—C bonds or via bridging groups, for example —O—, —CH$_2$—, —CO—NH—, —S—, —CO— or —SO$_2$—.

Examples of polycyclic aromatic radicals whose valence bonds are in a kinked position which is comparable to the meta position are 1,6-naphthylene, 2,7-naphthylene or 3,4'-biphenylene.

A preferred example of a monocyclic aromatic radical of this type is 1,3-phenylene.

Preferred radicals R$^3$ and R$^4$ of the formula IV are those where Z is selected from the group consisting of —O—, —CH$_2$— and

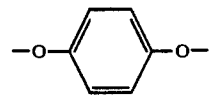

and where R$^6$ is hydrogen, chlorine, straight-chain $C_1$-$C_6$-alkyl, in particular methyl, or straight-chain $C_1$-$C_6$-alkoxy, in particular methoxy.

A particular preference is given to Z as a radical

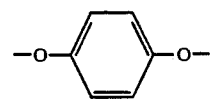

or —CH$_2$— and R$_6$ as hydrogen.

The polyamides according to the present invention may contain unsubstituted radicals and substituted radicals side by side in varying proportions.

More particularly, the polyamide may contain one or more kinds of substituted radicals Ar$^1$, Ar$^2$, R$^3$, R$^4$ and R$^5$; for example, it may contain exclusively methyl-substituted radicals or it may contain proportions of radicals having various alkyl substituents and/or having halogen substituents.

However, the polyamides according to the present invention may also contain exclusively substituted or unsubstituted radicals Ar$^1$, Ar$^2$, R$^3$, R$^4$ and R$^5$. Preference is given to those polyamides according to the present invention which contain only unsubstituted radicals or which contain up to about 30 mol% of substituted radicals, based on the polymer.

Further preferred aromatic copolyamides of the present invention can be processed into fibers or filaments which have a breaking extension of more than 3.5%. These fibers or filaments are likewise notable for excellent dynamic efficiency.

The preferred copolyamides of this type include compounds containing the recurring structural elements of the formulae Ia, Ib and Ie where R$^7$ is 1,4-phenylene and R$^3$ is a radical of 1,4-bis(4-aminophenoxy)benzene or of 4,4'-diaminodiphenylmethane and where the mole fractions of the radicals R$^2$, R$^3$ and R$^7$ lie within the following limits:

Radical R$^2$: from 10 to 50 mol%, in particular from 20 to 30 mol%,

Radical R$^3$: from 20 to 50 mol%, in particular from 20 to 30 mol%, and

Radical R$^7$: from 20 to 55 mol%, in particular from 35 to 55 mol%.

Very particularly preferred copolyamides of the present invention contain the recurring structural units of the formulae Ia, Ib and Ie where R$^3$ is a radical of 4,4'-diaminodiphenylmethane. Filaments and fibers from these copolyamides are notable for particularly good flex abrasion resistance and are easy to process.

To prepare the copolyamides containing the recurring structural units Ia, Ib and Ic and optionally Id it is advantageous to react a dicarbonyl dichloride of the formula V with a mixture of the dismines of the formulae VI, VII and VIII and optionally IX

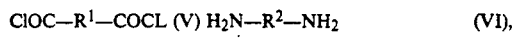
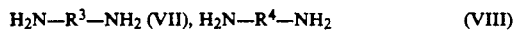

where $R^1$ to $R^5$ are each as defined above.

To prepare the copolyamides containing the recurring structural units Ia, Ib and Ie and optionally Id a dicarbonyl dichloride of the formula V as defined above is reacted with a mixture of the dismines of the formulae VI, VII, as defined above, and X, and optionally IX, as defined above

where $R^7$ is as defined above.

The dicarbonyl dichloride of the formula V and the individual diamine types can also be used in the form of mixtures.

Here the mixing ratios of the dismines VI, VII and VIII on the one hand and VI, VII and X and optionally IX on the other must in each case be chosen in such a way as to produce polyamides having the above-defined proportions of radicals $R^2$, $R^3$ and $R^4$ or $R^2$, $R^3$ and $R^7$.

It is self-evident to a person skilled in the art that the sum total of all the structural units derived from aromatic acids and the sum total of all the structural units derived from aromatic amines will be essentially the same, i.e. within about 1% at the most, preferably about 0.2% at the most of each other, in particular for the purposes of practical measuring and metering.

The molecular weight of the resulting polyamides can be controlled inter alia via the choice of the ratio of aromatic acid to aromatic amine. These selection criteria are known to the person skilled in the art of polycondensation.

Examples of suitable aromatic dicarboxylic acids from which the dicarbonyl dichlorides of the formula V was derived are naphthalene-1,4-dicarboxylic acid, naphthalene-1,5-dicarboxylic acid, naphthalene-2,6-dicarboxylic acid, biphenyl-4,4'-dicarboxylic acid, 2-chloroterephthalic acid, 2-bromoterephthalic acid, 2-methylterephthalic acid and in particular terephthalic acid.

Up to 5 mol% of dicarbonyl dichloride can also be derived from radicals $Ar^2$. Examples of acids from which such dicarbonyl dichlorides are derived are naphthalene-1,6-dicarboxylic acid, naphthalene-1,7-dicarboxylic acid, naphthalene-2,7-dicarboxylic acid, biphenyl-3,4'-dicarboxylic acid and in particular isophthalic acid.

Examples of suitable dismines of the formula X are naphthalene-1,4-diamine, naphthalene-1,5-diamine, naphthalene-2,6-diamine, benzidine and in particular 4,4'-diaminobenzanilide and p-phenylenediamine.

Examples of suitable diamines of the formula IX are naphthalene-1,6-diamine, naphthalene-1,7-diamine, naphthalene-2,7-diamine, biphenyl-3,4'-diamine, 3,4'-diaminobenzanilide and m-phenylenediamine.

Examples of suitable diamines of the formulae VII and VIII are 4,4'-diaminodiphenyl ether, 4,4'-diaminodiphenyl sulfide, 4,4'-diaminodiphenyl ketone, 4,4'-diaminodiphenyl sulfone, 4,4'-diaminodiphenyl-2,2-propylidene and in particular 1,4-bis(4'-aminophenoxy)-benzene and 4,4'-diaminodiphenylmethane and also the corresponding 3,3'-dichloro-, 3,3'-dimethyl- or 3,3'-dimethoxy-substituted derivatives of these diamines.

The copolymerization of the above-described monomeric compounds is in general carried out as a solution polymerization.

For this purpose, the aromatic monomeric compounds to be reacted with each other are in general dissolved in an organic solvent. This organic solvent preferably contains at least one solvent of the amide type, for example N-methyl-2-pyrrolidone, N,N-dimethylacetamide, tetramethylurea, N-methyl-2-piperidone, N,N'-dimethylethyleneurea, N,N,N',N'-tetramethylmaleamide, N-methylcaprolactam, N-acetylpyrrolidine, N,N-diethylacetamide, N-ethyl-2-pyrrolidone, N,N'-dimethylpropionamide, N,N-dimethylisobutylamide, N-methylformamide or N,N'-dimethylpropyleneurea.

Of importance for the process according to the present invention are the preferred organic solvents N-methyl-2-pyrrolidone, N,N-dimethylacetamide and a mixture thereof.

In a preferred form of carrying out the solution polymerization, the aromatic monomeric diamines are dissolved in an amide solvent. The solution thus obtained is then mixed with the at least one aromatic monomeric compound in the form of an aromatic dicarbonyl dihalide by vigorous stirring in order to initiate the copolymerization.

Here the amide solvent acts not only as solvent for the aromatic monomeric compounds and the aromatic copolyamide obtained therefrom but also as acid acceptor for a hydrogen halide, for example for hydrogen chloride, which is formed as by-product of the copolymerization of the aromatic monomeric compounds. In some cases it can be advantageous to use a solubility-promoting additive, for example a metal halide of one of the metals of group I or II of the periodic table, which is added to the copolymerization mixture before, during or after the copolymerization.

Examples of such additives are alkali metal halides, such as lithium chloride, or alkaline earth metal halides such as calcium chloride.

The polycondensation temperatures in the case of a solution polymerization are customarily between $-20°$ C. and $120°$ C., preferably between $+10°$ C. and $+100°$ C. Particularly good results are obtained at reaction temperatures between $+10°$ C. and $+80°$ C.

The sum total of the concentrations of the aromatic monomeric compounds in the polymerization mixture solution can be set with regard to the desired degree of polymerization, the desired viscosity of the polymerization mixture, the nature of the aromatic monomeric compounds used, the nature of the solvent used and the desired polymerization temperature. The most favorable sum total of the concentrations can be determined on the basis of a number of preliminary experiments on the course of the polymerization.

Polycondensation reactions are preferably carried out in such a way that, after the reaction has ended, from 2 to 15, preferably from 3.5 to 10, % by weight of polycondensate are present in the solution. Particularly good results are obtained with concentrations of from 5.0 to 7.5% by weight.

In the course of the polycondensation an increase takes place in the molecular weight of the polymer and hence also in the viscosity of the reaction batch.

The polymer molecule has reached an adequate chain length when the viscosity of the polymer solution obtained in the course of the polycondensation corresponds to an inherent viscosity of the polymer of about 2.5 to 7.0 dl/g.

The inherent viscosity is defined as $$\eta\text{inh} = \frac{\ln \eta_{rel}}{c}$$

where $\eta_{rel}$ is the relative viscosity and c is the concentration in g/dl.

For the purposes of the present invention the inherent viscosity is determined on solutions of 0.5 g of polymer in 100 ml of 98% by weight sulfuric acid at 25° C.

The outlined process for preparing aromatic polyamides, which is known per se, likewise forms part of the subject-matter of the present invention inasmuch as it concerns the preparation of the above-described aromatic polyamides according to the present invention.

When the polymer solution has reached the viscosity required for further processing, the polycondensation can be stopped in a conventional manner by adding monofunctional compounds, for example acetyl chloride. Subsequently the hydrogen chloride formed, which is bound loosely to the amide solvent, can be neutralized by adding basic substances. Suitable for this purpose are for example lithium hydroxide, calcium hydroxide, but in particular calcium oxide.

The aromatic copolyamide obtained on carrying out the process according to the present invention can be isolated from the copolymerization mixture by a separating process, for example by precipitation. To prepare a solution for extruding the copolyamide, the aromatic copolyamide thus isolated is then dissolved in a suitable organic solvent.

In those cases, however, where the aromatic copolyamide according to the present invention is prepared by the method of solution polymerization, the copolyamide, being readily soluble in the solvent for the polymerization, is of course already in the completely dissolved state and therefore, in the industrial practice of the process according to the present invention, it is advantageous that the as-polymerized mixture is directly used as solution for extruding the aromatic copolyamide.

The aromatic copolyamide according to the present invention is readily soluble in an organic solvent, for example in organic solvents of the amide type, and possesses excellent heat resistance and superior chemical resistance. The aromatic copolyamide according to the present invention is particularly useful for preparing various formed articles, for example filaments, fibers, yarns, films and sheets, which likewise form part of the subject-matter of the present invention. These structures not only possess excellent heat resistance and chemical resistance but also have superior mechanical properties, for example in terms of tensile strength, abrasion resistance and modulus of elasticity. The solution of the aromatic copolyamide can likewise be used in various ways, for example for producing fibers, films, sheetlike elements, fibrous materials and other formed articles.

To prepare the solution for extruding the aromatic copolyamide the solvent used is preferably a solvent of the amide type, in particular one of the abovementioned solvents of the amide type or a mixture of two or more of said compounds.

To prepare the extruding solution it is advantageous to maintain the concentration of the aromatic copolyamide within a range between 4 and 5% by weight, in particular between 6 and 10% by weight. If necessary, the extruding solution may contain an additive for promoting solubility, in which case at least one metal halide of a metal of groups I and II of the periodic table may be used, for example lithium chloride, calcium chloride or magnesium bromide, in a concentration between 0.2 and 10%, preferably between 0.5 and 5%, based on the total weight of the extruding solution. The solubility promoter also aids the stability of the extruding solution at elevated temperature.

The extruding of the solution to give a formed article can be effected by any suitable dry, wet or dry-wet process. In those cases where a wet process is used, for example in order to form the extruding solution into filaments, the extruding or, in this case, the spinning solution is extruded or more precisely spun through a die, for example a spinning die or spinneret, into a coagulating liquid. Here it is usually advantageous for the coagulation liquid to be water or an aqueous solution containing a polar organic solvent. This polar organic solvent can be selected from among the same amide solvents which are usually used for dissolving the aromatic copolyamide. A preferred polar organic solvent used in the coagulation liquid is preferably the same solvent as is present in the extruding solution. The coagulation liquid is preferably used at a temperature between 0° C. and the atmospheric pressure boiling point of the coagulation liquid. The polar organic solvent is preferably in the coagulation liquid in a concentration between 70% by weight and less, in particular between 50% by weight and less.

The above-described extrusion process is particularly suitable for preparing films or filament from an extrudable solution.

In the preparation of filaments from the aromatic copolyamide, the extruding or spinning solution is extruded through a spinneret with a plurality of holes, the filamentous streams of the spun solution being consolidated either in one of the abovementioned coagulation liquids (wet process) or in an evaporation-conducive atmosphere (dry process). The spinning can be effected using a customary horizontal or vertical wet-spinning machine, a dry jet wet-spinning machine or a spinning machine in which the material flows downward under tension. A likewise suitable variant is the dry-jet wet-spinning process as described for example in U.S. Pat. No. 3 414 645.

In the wet-spinning of an aromatic copolyamide according to the present invention, coagulation is preferably effected using a coagulation liquid containing a coagulation-promoting additive, and this coagulation is followed by a further coagulation step in the course of which the coagulating filaments of the aromatic copolyamide pass into a waterbath which is maintained at a temperature between 0° and 100° C. The additional coagulation step serves to complete the coagulation by removing the solvent. Also, coagulation-promoter additives, if such substances are used, are washed out of the coagulated filaments.

From the foregoing description it is clear that the aromatic copolyamide according to the present invention is readily processible into filaments using customary spinning processes and apparatus without a hazardous or harmful solvent, for example concentrated sulfuric acid, having to be used. This reduces the danger to the operating personnel. Also, the filaments prepared from the copolyamide according to the present invention have a dense internal structure.

The extruding solution can also be processed into a film or sheet using customary spreading or extruding processes.

Filaments or films prepared by the above-described extruding processes are customarily subjected to a drawing process which improves not only the mechanical properties, for example the tensile strength and the modulus of elasticity, but also the thermal properties, for example the thermal stability, of the filaments or sheets thus prepared.

Filaments of the aromatic copolyamides according to the present invention are in general drawn to achieve a high mechanical strength and a high modulus of elasticity. The draw ratio employed is customarily about 1:3 to 1:15. The drawing temperature is in general between 250° and 500° C., preferably between 300° and 450° C.

Drawing can be carried out in a single stage, in two stages or in several stages using a hotplate or a cylindrical heater. Moreover, the drawn filaments or sheets can be subjected to a further heat treatment at the same or a higher temperature in order to improve their crystalline structure. It may be pointed out in this connection that the aromatic copolyamide according to the present invention is surprisingly advantageous not only in respect of its solubility in customary organic solvents but, following the preparation of the filaments or sheets, is readily drawable under "mild" operating conditions.

The filaments, fibers or fibrous materials made of an aromatic copolyamide according to the present invention, which have excellent mechanical and thermal properties and a high dynamic efficiency, can be used industrially in various ways, for example as reinforcing materials for the fabric layers of car tires and other rubber articles, as heat-resistant insulation materials, for manufacturing filter fabrics and as lightweight insulation materials. Films or sheets made of an aromatic copolyamide according to the present invention can also be used as heat-resistant electric insulation materials.

Further properties and advantages of the invention will now be more particularly described with reference to examples. It will be understood, however, that the invention is not restricted to the embodiment examples. On the contrary, on the basis of the embodiment examples the person skilled in the art has many possible modifications and/or additions at his/her disposal without having to depart from the basic concept of the invention.

EXAMPLE 1

Aromatic copolyamide from 100 mol% of terephthaloyl dichloride, 50 mol% of p-phenylenediamine, 25 mol% of 4,4'-diaminodiphenylmethane and 25 mol% of 3,4'-diaminodiphenyl ether.

21.6 g (0.2 mol) of p-phenylenediamine, 20.0 g (0.1 mol) of 3,4'-diaminodiphenyl ether and 19.8 g (0.1 mol) of 4,4'-diaminodiphenylmethane are dissolved in 2100 g of N-methylpyrrolidone under nitrogen and 91.2 g (0.4 mol) of terephthaloyl dichloride are added at between 20° C. and 50° C. in the course of 60 minutes. The solution is subsequently stirred at 72° C. On attainment of the desired viscosity ($\eta_{inh}$, 3.5 dl/g) the polycondensation is stopped by adding 1.2 g of acetyl chloride and then neutralized with 24.5 g of calcium oxide. The solution is filtered, devolatized and wet-spun. To this end it is spun from a spinneret with 100 holes each 0.1 mm in diameter at a speed of 16.1 m/min into a coagulation bath comprising a hot (80° C.) solution of 35% of N-methylpyrrolidone in water. The filaments obtained are drawn through two water baths, one washer, over a drying godet and finally over a hotplate at 460° C. in a draw ratio of 1:8.1.

The filament linear density is 1.83 dtex, the tenacity is 146 cN/tex, the extension is 4.7% and the initial modulus is 30 N/tex, based on 100% extension.

EXAMPLES 2 to 19

The procedure described in Example 1 is employed to prepare, spin and test further aromatic copolyamides. Table I below lists the diamines used, the mixing ratios thereof, the solution viscosities of the resulting polymers, the spinning conditions and the properties of the fibers obtained. The dicarboxylic acid component used in each case is terephthaloyl dichloride. The key to the abbreviations used in Table I for the diamines is as follows:

PPD = p-phenylenediamine
DADPE = 3,4'-diaminodiphenyl ether
BAPOB = 1,4-bis(4-aminophenoxy)benzene
DABA = 4,4'-diaminobenzanilide
DADPM = 4,4'-diaminodiphenylmethane

TABLE I

|  | Example No. | | | | |
|---|---|---|---|---|---|
|  | 2 | 3 | 4 | 5 | 6 |
| PPD (mol %) | 60 | 50 | 25 | 50 | 25 |
| DADPE (mol %) | 20 | 25 | 50 | 10 | 25 |
| DABA (mol %) | — | — | — | — | — |
| BAPOB (mol %) | 20 | 25 | 25 | 40 | 50 |
| Filament linear density (dtex) | 1.65 | 1.84 | 1.93 | 0.70 | 1.71 |
| Breaking strength (cN/tex) | 46 | 98 | 39 | 119 | 78 |
| Extension (%) | 2.4 | 3.6 | 1.9 | 3.9 | 4.0 |
| Initial modulus (N/tex) | 24 | 32 | 25 | 31 | 25 |
| Draw ratio 1: | 3.4 | 6.0 | 5.0 | 6.8 | 4.6 |

|  | Example No. | | | | | | |
|---|---|---|---|---|---|---|---|
|  | 7 | 8 | 9 | 10 | 11 | 12 | 13 |
| PPD (mol %) | 25 | 25 | 30 | 40 | 40 | 50 | 60 |
| DADPE (mol %) | 50 | 25 | 35 | 30 | 20 | 30 | 20 |
| DADPM (mol %) | 25 | 50 | 35 | 30 | 40 | 20 | 20 |
| Filament linear density (dtex) | 1.84 | 1.53 | 1.55 | 1.91 | 2.07 | 1.68 | 1.96 |
| Breaking strength (cN/tex) | 75 | 41 | 39 | 42 | 43 | 72 | 47 |
| Extension (%) | 4.3 | 4.9 | 3.3 | 3.4 | 5.8 | 3.5 | 2.7 |
| Initial modulus (N/tex) | 24 | 12 | 14 | 17 | 11 | 27 | 21 |
| Draw ratio 1: | 5.5 | 5.0 | 7.2 | 5.4 | 4.3 | 5 | 4.0 |

|  | Example No. 14 |
|---|---|
| DADPE (mol %) | 25 |
| DADPM (mol %) | 25 |
| BAPOB (mol %) | 50 |
| Filament linear density (dtex) | 4.38 |
| Breaking strength (cN/tex) | 28 |
| Extension (%) | 5.1 |

TABLE I-continued

| | | | | | |
|---|---|---|---|---|---|
| Initial modulus (N/tex) | | | 9 | | |
| Draw ratio 1: | | | 2.2 | | |

| | Example No. | | | | |
|---|---|---|---|---|---|
| | 15 | 16 | 17 | 18 | 19 |
| DADPE (mol %) | 25 | 20 | 25 | 25 | 50 |
| DABA (mol %) | 50 | 65 | 25 | 50 | 25 |
| DADPM (mol %) | 25 | 15 | — | — | — |
| BAPOB (mol %) | — | — | 50 | 25 | 25 |
| Filament linear density (dtex) | 131 | 266 | 177 | 151 | 90 |
| Breaking strength (cN/tex) | 102 | 37 | 101 | 134 | 117 |
| Extenstion (%) | 3.4 | 1.3 | 4.0 | 3.8 | 3.8 |
| Initial modulus (N/tex) | 33 | 33 | 28 | 37 | 36 |
| Draw ratio 1: | 5.8 | 11.6 | 6 | 5.6 | 6.5 |

EXAMPLE 20

Determination of the flex abrasion resistance of a yarn made of a copolyamide according to the invention A yarn made of copolyamide according to Example 1 is subjected under a predetermined load to repeated abrasion from a standard yarn (=identical to yarn being abrasion tested). The quantity measured is the number of cycles until the moving yarn breaks. Two experiments are carried out under identical test conditions and with the same material. The following results are obtained:

| Load (cN/dtex) | 1st measurement cycles | 2nd measurement cycles |
|---|---|---|
| 0.2 | 22,820 | —[1)] |
| 0.4 | 13,976 | 8,482 |
| 0.6 | 4,329 | 3,567 |

[1)]not measured

What is claimed is:

1. An aromatic copolyamide which is soluble in an organic polyamide solvent and consists essentially of at least 95 mol% of recurring structural units of the formulae Ia, Ib and Ic without or with up to 5 mol% of recurring structural units of the formula Id

[—OC—R$^1$—CO—NH—R$^2$—NH—] (Ia),
[—OC—R$^1$—CO—NH—R$^3$—NH—] (Ib),

[—OC—R$^1$—CO—NH—R$^4$—NH—] (Ic),
[—OC—R$^1$—CO—NH—R$^5$—NH—] (Id), where at least 95 mol% of all radicals R$^1$ have a structure of the formula IIa and up to 5 mol% of all the radicals R$^1$ have the structure of the formula IIb —Ar$^1$— (IIa), —Ar$^2$— (IIb), where Ar$^1$ is a divalent aromatic radical having valence bonds in the para or a comparable coaxial or parallel position relative to one another and which is optionally substituted by one or two inert radicals, and Ar$^2$ is a divalent aromatic radical having valence bonds in the meta or a comparable kink position relative to one another and which is optionally substituted by one or two inert radicals, R$^2$ is a radical of formula III

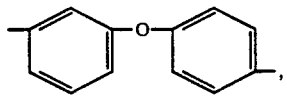
(III)

R$^3$ is a radical of the formula IV

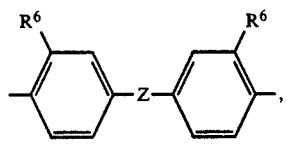
(IV)

where each R$^6$ is independently of the other hydrogen or an inert radical and Z is selected from the group consisting of —O—, —S—, —CO—, —SO$_2$—, —C$_n$H$_{2n}$— and is as defined above, R$^4$ is a radical which differs from R$^3$ and is selected from one of the structures defined for R$^3$, R$^5$ is a radical selected from one of the structures defined for Ar$^2$, and with the proviso that the mole fractions of the radicals R$^2$, R$^3$ and R$^4$, based on the sum total of these radicals, lie within the following limits:

Radical R$^2$: from 5 to 70 mol%,
Radical R$^3$: from 5 to 70 mol%, and
Radical R$^4$: from 5 to 70 mol%.

2. A copolyamide as claimed in claim 1, wherein Ar$^1$ is 1,4-phenylene, Ar$^2$ is 1,3-phenylene, R$^5$ is 1,3-phenylene, and R$^3$ and R$^4$ are each selected from the group consisting of the radicals of the formula IV as defined in claim 1, where Z is —O—, —CH$_2$— or

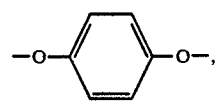

and R$^6$ is hydrogen, chlorine, straight-chain C$_1$-C$_6$-alkyl or straight-chain C$_1$-C$_6$-alkoxy.

3. A copolyamide as claimed in claim 1, wherein R$^3$ is a radical of 4,4'-diaminodiphenylmethane and R$^4$ is a radical of 1,4-bis(4-aminophenoxy)benzene and the mole fractions of the radicals R$^2$, R$^3$ and R$^4$, based on the sum total of these radicals, lie within the following limits:

Radical R$^2$: from 20 to 30 mol%,
Radical R$^3$: from 20 to 30 mol%, and
Radical R$^4$: from 40 to 60 mol%.

4. An article comprising an aromatic copolyamide as claimed in claim 1.

5. The article of claim 4 selected from the group consisting of a filament fiber, yarn, film or sheet.

6. An aromatic copolyamide which is soluble in an organic polyamide solvent and consists essentially of at least 95 mol% of recurring structural units the formulae Ia, Ib and Ie without or with up to 5 mol% of recurring structural units of the formula Id

[—OC—R$^1$—CO—NH—R$^2$—NH—] (Ia),
[—OC—R$^1$—CO—NH—R$^3$—NH—] (Ib),

[—OC—R$^1$—CO—NH—R$^4$—NH—] (Ic),
[—OC—R$^1$—CO—NH—R$^5$—NH—] (Id), where at least 95 mol% of all radicals $R^1$ have a structure of the formula IIa and up to 5 mol% of all the radicals $R^1$ have the structure of the formula IIb $$—Ar^1— \quad (IIa), \quad —Ar^2— \quad (IIb),$$

where $Ar^1$ is a divalent aromatic radical having valence bonds in the para or a comparable coaxial or parallel position relative to one another and which is optionally substituted by one or two inert radicals, and $Ar^2$ is a divalent aromatic radical having valence bonds in the meta or a comparable kinked position relative to one another and which is optionally substituted by one or two inert radicals, $R^2$ is a radical of formula III

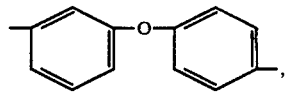 (III)

$R^3$ is a radical of the formula IV

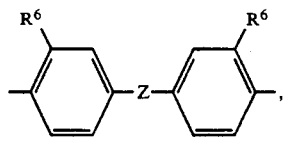 (IV)

where each $R^6$ is, independently of the other, hydrogen or an inert radical and Z is selected from the group consisting of —O—, —S—, —CO—, —SO$_2$—, —C$_n$H$_{2n}$— and —O—Ar$^1$—O—, where n is an integer from 1 to 10 and $Ar^1$ is as defined above, $R^5$ is a radical selected from one of the structures defined for $Ar^2$, and $R^7$ is an unsubstituted divalent aromatic radical having valence bonds in the para of a comparable coaxial or parallel position relative to one another, with the proviso that the mole fractions of the radicals $R^2$, $R^3$ and $R^7$, based on the sum total of these radicals, lie within the following limits:

Radical $R^2$: from 5 to 70 mol%,
Radical $R^3$: from 15 to 70 mol%, and
Radical $R^7$: from 5 to 70 mol%.

7. A copolyamide as claimed in claim 6, wherein $R^3$ is selected from the group consisting of said radicals of the formula IV in which Z is —O—, —CH$_2$— or

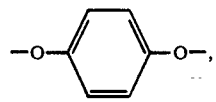

and said inerts radical is chlorine, C$_1$-C$_6$-alkoxy, $R^5$ is 1,3-phenylene and $R^7$ is selected from the group consisting of 1,4-phenylene and the radical of 4,4-diaminobenzanilide.

8. A copolyamide as claimed in claim 6, wherein $R^7$ is 1,4-phenylene and $R^3$ is a radical of 1,4-bis(4-aminophenoxy)benzene or of 4,4'-diaminodiphenylmethane and the mole fractions of the radical $R^2$, $R^3$ and $R^7$, based on the sum total of these radicals, lie within the following limits:

Radical $R^2$: from 20 to 30 mol%,
Radical $R^3$: from 20 to 30 mol%, and
Radical $R^7$: from 35 to 55 mol%.

9. A copolyamide as claimed in claim 8, wherein $R^3$ is a radical of 4,4'-diaminodiphenylmethane.

10. An article comprising an aromatic copolyamide as claimed in claim 6.

11. The article of claim 10 selected from the group consisting of a filament fiber, yarn, film or sheet.

12. A copolyamide according to claim 6, wherein:
$R^1$ has the structure of the formula IIa, and said structure of formula IIa is 1,4-phenylene,
in said formula IV, Z is

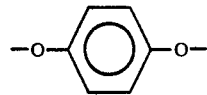

$R^5$ is 1,3-phenylene, and
$R^7$ is 1,4-phenylene.

* * * * *